(12) United States Patent
Sasaki

(10) Patent No.: US 12,248,715 B2
(45) Date of Patent: Mar. 11, 2025

(54) IMAGE FORMING APPARATUS AND METHOD FOR CONTROLLING THE SAME

(71) Applicant: CANON KABUSHIKI KAISHA, Tokyo (JP)

(72) Inventor: Hidemi Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/513,383

(22) Filed: Nov. 17, 2023

(65) Prior Publication Data

US 2024/0168686 A1   May 23, 2024

(30) Foreign Application Priority Data

Nov. 21, 2022   (JP) ................................. 2022-185372

(51) Int. Cl.
G06F 3/12   (2006.01)
(52) U.S. Cl.
CPC .......... *G06F 3/1219* (2013.01); *G06F 3/1253* (2013.01); *G06F 3/1273* (2013.01)
(58) Field of Classification Search
CPC ..... G06F 3/1219; G06F 3/1253; G06F 3/1273
USPC ........................ 358/1.13, 1.15, 1.9
See application file for complete search history.

(56) References Cited

U.S. PATENT DOCUMENTS

| | | | |
|---|---|---|---|
| 10,379,801 B1* | 8/2019 | Waller | G06F 3/1285 |
| 2008/0304110 A1* | 12/2008 | Simske | G06K 1/121 |
| | | | 358/3.28 |
| 2010/0332636 A1* | 12/2010 | Sato | H04N 1/32122 |
| | | | 718/102 |
| 2014/0036311 A1* | 2/2014 | Sato | G06F 3/1211 |
| | | | 358/1.15 |
| 2017/0083265 A1* | 3/2017 | Watanabe | G03G 15/5075 |

FOREIGN PATENT DOCUMENTS

JP   2018072809 A   5/2018

* cited by examiner

*Primary Examiner* — Quang N Vo
(74) *Attorney, Agent, or Firm* — Canon U.S.A., Inc. IP Division

(57) ABSTRACT

An image forming apparatus including an execution unit configured to perform printing with a color fadable recording agent and printing with a color unfadable recording agent, includes a reception interface (IF) configured to receive a print job, and a controller having one or more processors which execute instructions stored in one or more memories, the controller being configured to set a recording agent to be used in executing the print job received by the reception IF, based on job attributes of the print job, including at least one of sending source information and an image data format.

17 Claims, 17 Drawing Sheets

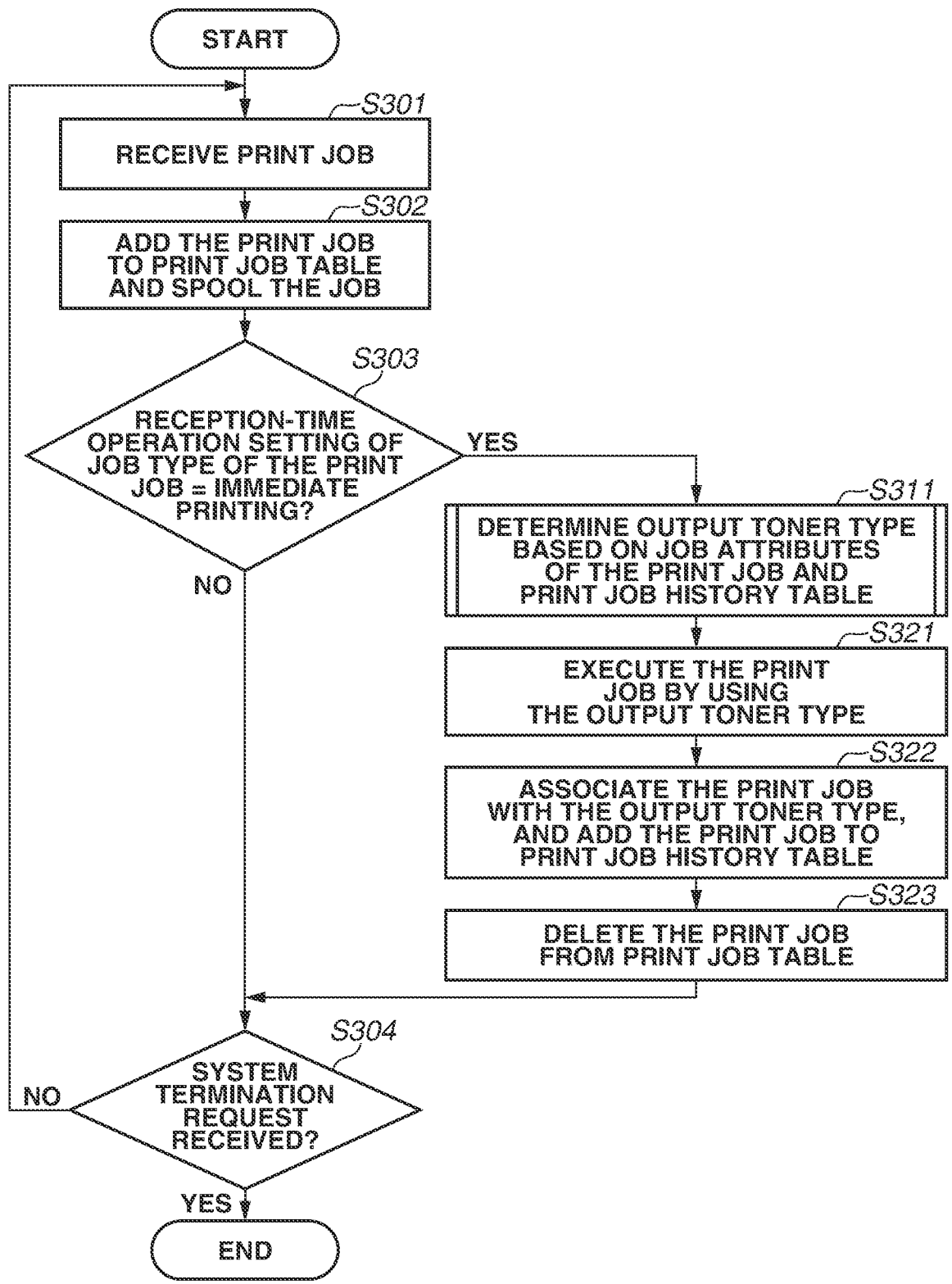

FIG.4A

| SELECTION | JOB ID | SENDING SOURCE INFORMATION (TELEPHONE NUMBER) | RECEPTION DATE AND TIME | NUMBER OF PAGES | IMAGE FORMAT |
|---|---|---|---|---|---|
| ◉ | 7 | xxxx-xxxx | OCT. 3, 2022 7:18 P.M. | 2 | BINARY |
| ○ | 8 | xxxx-yyyy | OCT. 4, 2022 10:20 A.M. | 4 | COLOR |
| ○ | 9 | xxxx-vvvv | OCT. 4, 2022 1:05 P.M. | 5 | BINARY |

JOB SELECTION SCREEN — FAX JOB (411)

410

EXECUTE PRINTING (401) | DELETE JOB (402) | CANCEL (403)

FIG.4B

JOB PRINTING SCREEN

PRINT SETTINGS (471)
- OUTPUT TONER TYPE
  - ○ REGULAR TONER
  - ◉ COLOR FADABLE TONER
- ☐ TWO-SIDED PRINTING
- ☐ STAPLING

JOB ATTRIBUTES
Job ID: 7
SENDING SOURCE: xxxx-xxxx
RECEPTION DATE AND TIME: OCT. 3, 2022 7:18 P.M.

461

EXECUTE PRINTING (451) | DELETE JOB (452) | CANCEL (453)

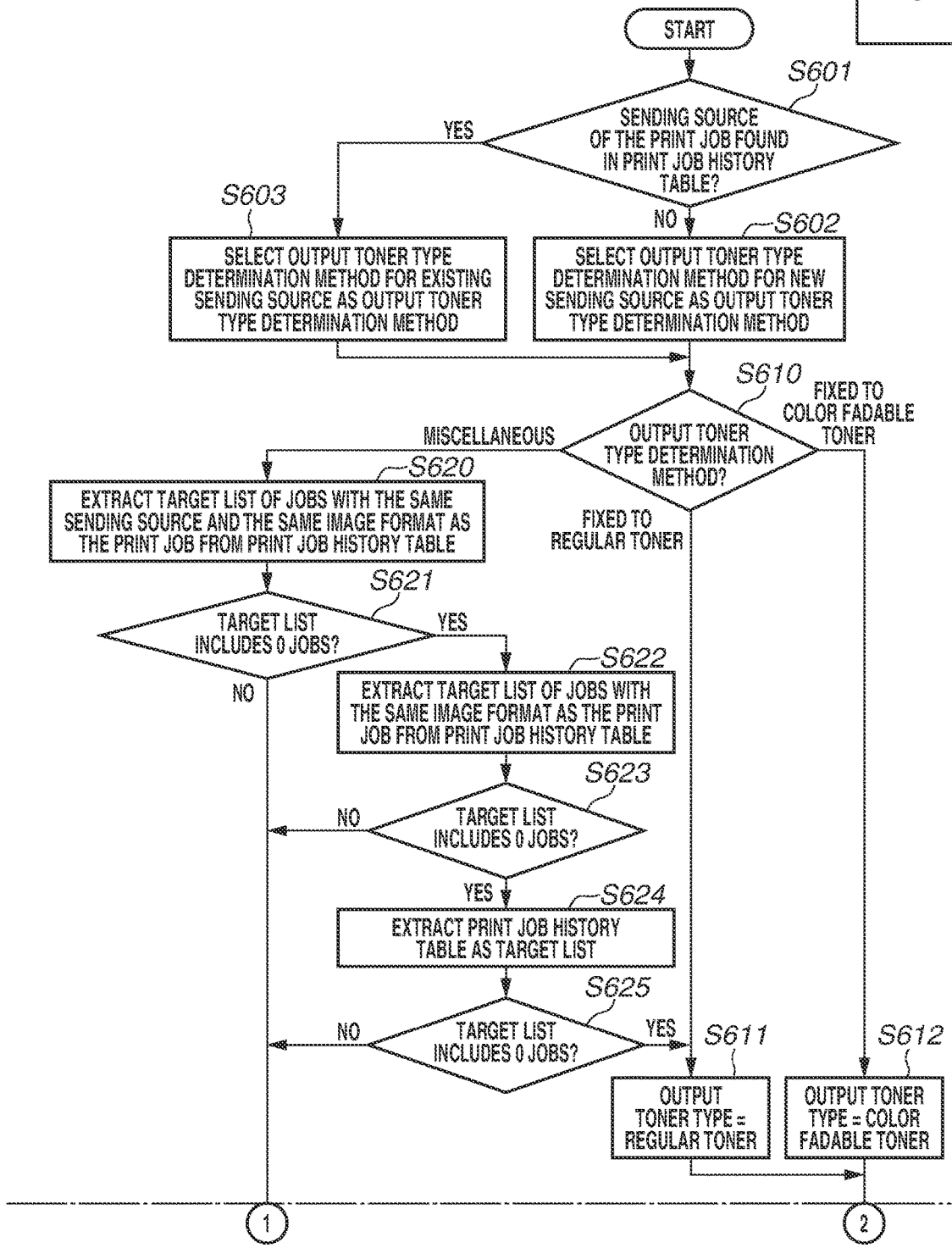

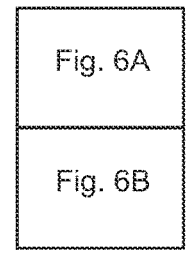
FIG.6B
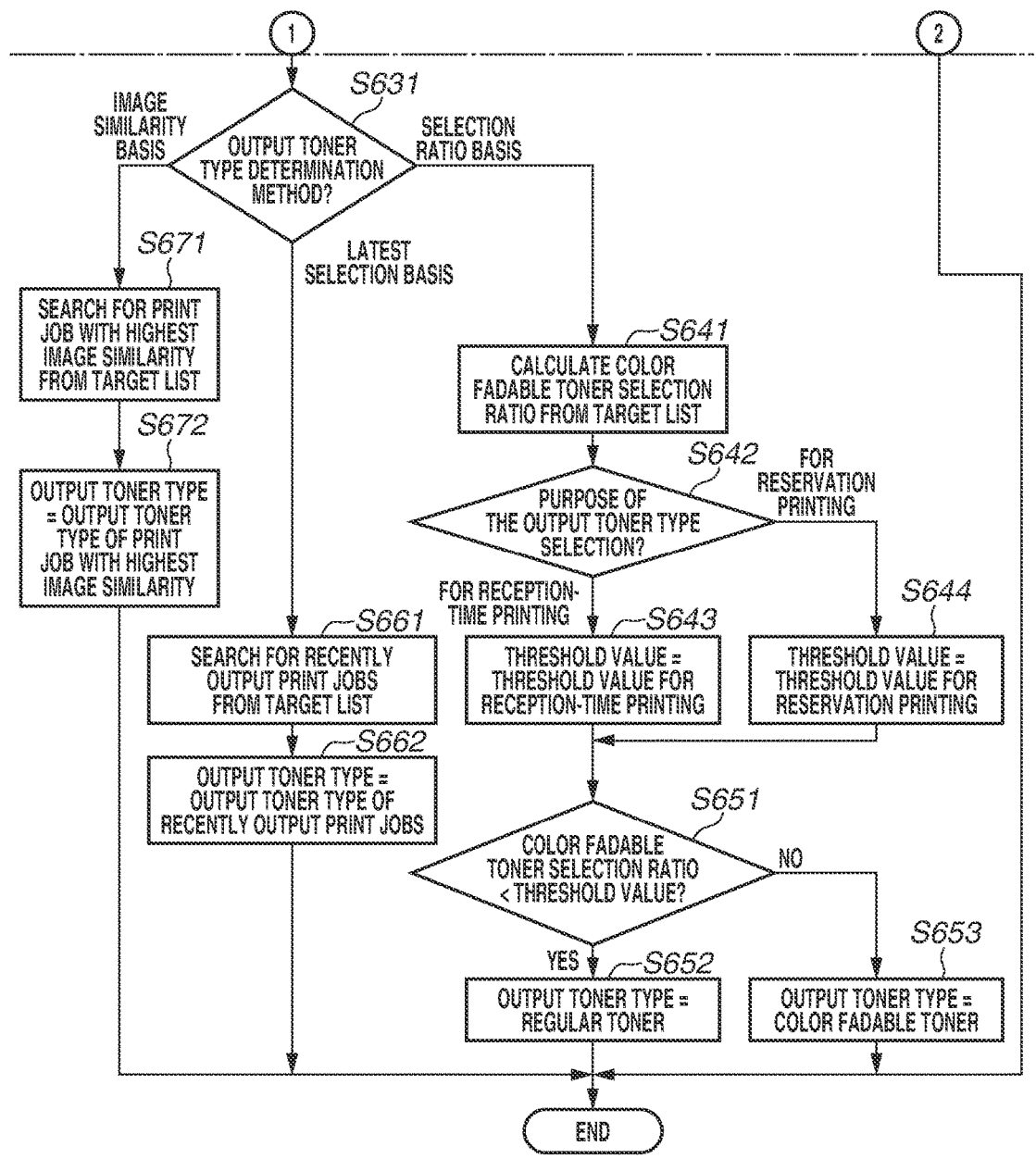

FIG.7A

JOB HISTORY SCREEN — FAX JOB ▽ — 411

| SELECTION | JOB ID | SENDING SOURCE INFORMATION (TELEPHONE NUMBER) | PRINTING DATE AND TIME | IMAGE FORMAT | OUTPUT TONER TYPE |
|---|---|---|---|---|---|
| ◉ | 1 | xxxx-xxxx | OCT. 1, 2022 2:00 P.M. | BINARY | REGULAR TONER |
| ○ | 2 | xxxx-xxxx | OCT. 2, 2022 3:00 P.M. | BINARY | COLOR FADABLE TONER |
| ○ | 3 | xxxx-yyyy | OCT. 2, 2022 4:41 P.M. | COLOR | REGULAR TONER |
| ○ | 4 | xxxx-yyyy | OCT. 3, 2022 1:21 A.M. | COLOR | REGULAR TONER |
| ○ | 5 | xxxx-xxxx | OCT. 3, 2022 2:20 P.M. | BINARY | COLOR FADABLE TONER |
| ○ | 6 | xxxx-zzzz | OCT. 3, 2022 4:16 P.M. | BINARY | REGULAR TONER |

— 710

[EXECUTE RE-PRINTING] 721     [CANCEL] 722

FIG.7B

JOB RE-PRINTING SCREEN

PRINT SETTINGS — 751
- OUTPUT TONER TYPE
  - ◉ REGULAR TONER
  - ○ COLOR FADABLE TONER
- ☐ TWO-SIDED PRINTING
- ☐ STAPLING

JOB ATTRIBUTES
Job ID: 1
SENDING SOURCE: xxxx-xxxx
RECEPTION DATE AND TIME: OCT. 3, 2022 7:18 P.M.
PRINTING DATE AND TIME: OCT. 1, 2022 2:00 P.M.

[EXECUTE RE-PRINTING] 761     [CANCEL] 762

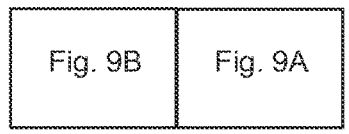
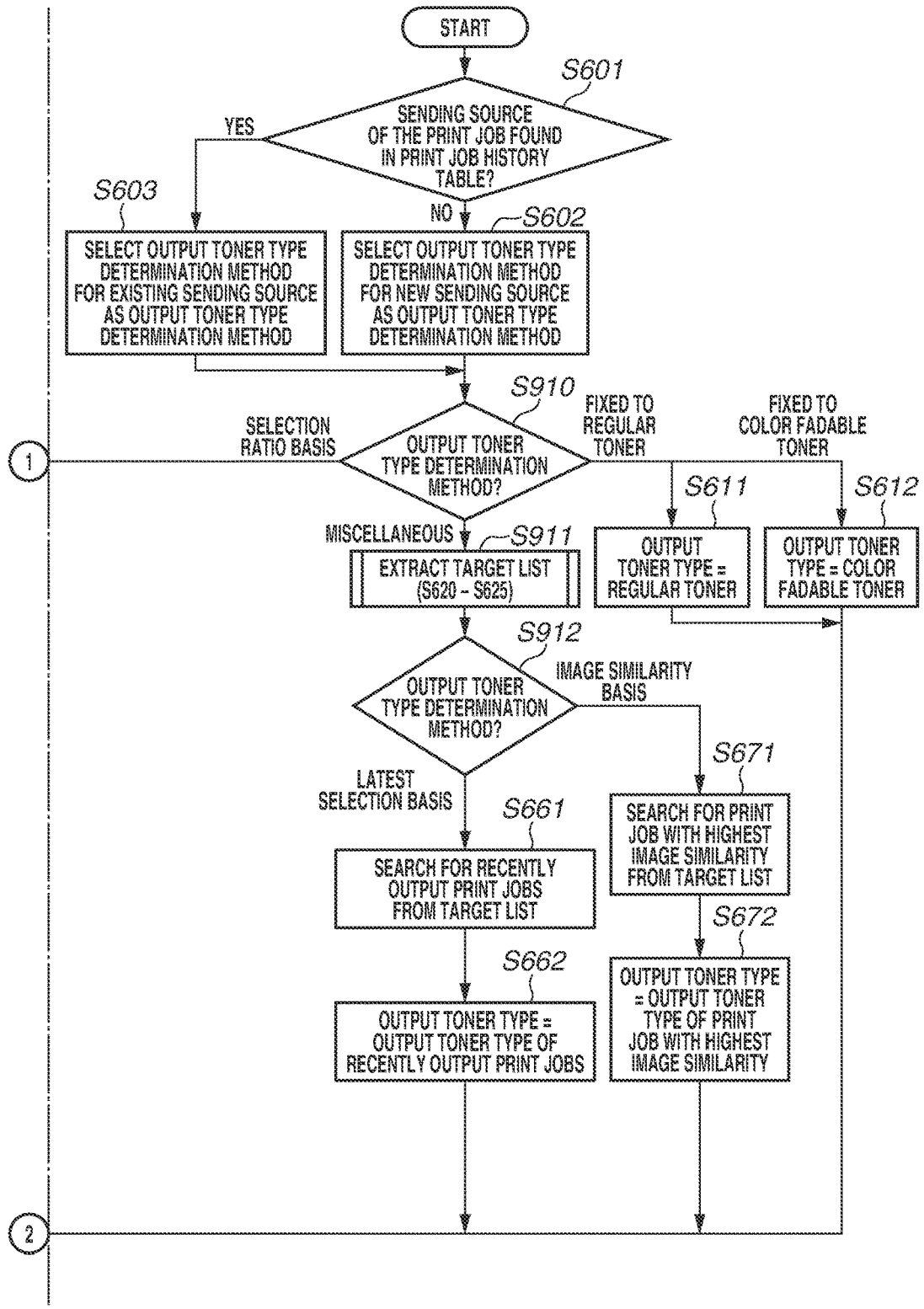

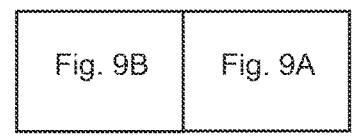
FIG. 9
FIG.9B
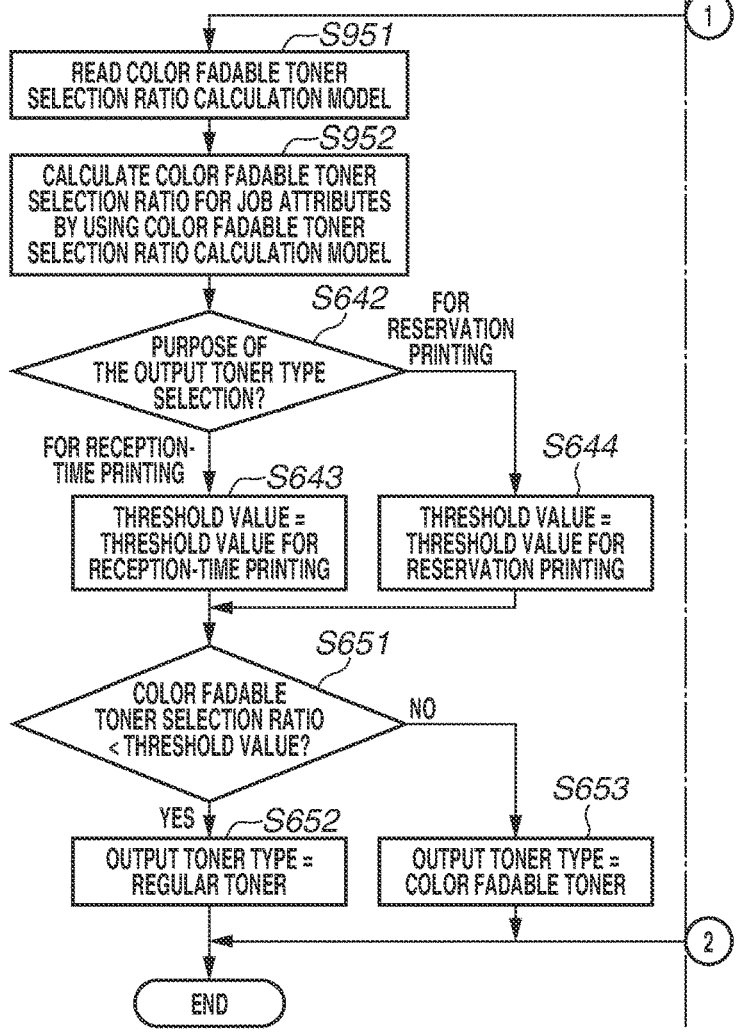

FIG.10A

| PRINT JOB TABLE | | | | |
|---|---|---|---|---|
| JOB ID | SENDING SOURCE INFORMATION (TELEPHONE NUMBER) | RECEPTION DATE AND TIME | NUMBER OF PAGES | IMAGE FORMAT |
| 0x0000_0007 | xxxx-xxxx | OCT. 3, 2022 7:18 P.M. | 2 | BINARY |
| 0x0000_0008 | xxxx-yyyy | OCT. 4, 2022 10:20 A.M. | 4 | COLOR |
| 0x0000_0009 | xxxx-vvvv | OCT. 4, 2022 1:05 P.M. | 5 | BINARY |

FIG.10B

| PRINT JOB HISTORY TABLE | | | | | | |
|---|---|---|---|---|---|---|
| JOB ID | SENDING SOURCE INFORMATION (TELEPHONE NUMBER) | RECEPTION DATE AND TIME | NUMBER OF PAGES | IMAGE FORMAT | PRINTING DATE AND TIME | OUTPUT TONER TYPE |
| 0x0000_0001 | xxxx-xxxx | OCT. 1, 2022 2:00 P.M. | 1 | BINARY | OCT. 1, 2022 2:01 P.M. | REGULAR TONER |
| 0x0000_0002 | xxxx-xxxx | OCT. 2, 2022 3:00 P.M. | 3 | BINARY | OCT. 2, 2022 3:01 P.M. | COLOR FADABLE TONER |
| 0x0000_0003 | xxxx-yyyy | OCT. 2, 2022 4:41 P.M. | 10 | COLOR | OCT. 4, 2022 9:11 A.M. | REGULAR TONER |
| 0x0000_0004 | xxxx-yyyy | OCT. 3, 2022 1:21 A.M. | 4 | COLOR | OCT. 4, 2022 9:15 A.M. | REGULAR TONER |
| 0x0000_0005 | xxxx-xxxx | OCT. 3, 2022 2:20 P.M. | 3 | BINARY | OCT. 3, 2022 2:32 P.M. | COLOR FADABLE TONER |
| 0x0000_0006 | xxxx-zzzz | OCT. 3, 2022 4:16 P.M. | 5 | BINARY | OCT. 3, 2022 4:42 P.M. | REGULAR TONER |

FIG.11A

| TARGET LIST FOR JOBID = 0x0000_0007 | | | | | | |
|---|---|---|---|---|---|---|
| JOBID | SENDING SOURCE INFORMATION (TELEPHONE NUMBER) | RECEPTION DATE AND TIME | NUMBER OF PAGES | IMAGE FORMAT | PRINTING DATE AND TIME | OUTPUT TONER TYPE |
| 0x0000_0001 | xxxx-xxxx | OCT. 1, 2022 2:00 P.M. | 1 | BINARY | OCT. 1, 2022 2:01 P.M. | REGULAR TONER |
| 0x0000_0002 | xxxx-xxxx | OCT. 2, 2022 3:00 P.M. | 3 | BINARY | OCT. 2, 2022 3:01 P.M. | COLOR FADABLE TONER |
| 0x0000_0005 | xxxx-xxxx | OCT. 3, 2022 2:20 P.M. | 3 | BINARY | OCT. 3, 2022 2:32 P.M. | COLOR FADABLE TONER |

FIG.11B

| TARGET LIST FOR JOBID = 0x0000_0008 | | | | | | |
|---|---|---|---|---|---|---|
| JOBID | SENDING SOURCE INFORMATION (TELEPHONE NUMBER) | RECEPTION DATE AND TIME | NUMBER OF PAGES | IMAGE FORMAT | PRINTING DATE AND TIME | OUTPUT TONER TYPE |
| 0x0000_0003 | xxxx-yyyy | OCT. 2, 2022 4:41 P.M. | 10 | COLOR | OCT. 4, 2022 9:11 A.M. | REGULAR TONER |
| 0x0000_0004 | xxxx-yyyy | OCT. 3, 2022 1:21 A.M. | 4 | COLOR | OCT. 4, 2022 9:15 A.M. | REGULAR TONER |

FIG.11C

| TARGET LIST FOR JOBID = 0x0000_0009 | | | | | | |
|---|---|---|---|---|---|---|
| JOBID | SENDING SOURCE INFORMATION (TELEPHONE NUMBER) | RECEPTION DATE AND TIME | NUMBER OF PAGES | IMAGE FORMAT | PRINTING DATE AND TIME | OUTPUT TONER TYPE |
| 0x0000_0001 | xxxx-xxxx | OCT. 1, 2022 2:00 P.M. | 1 | BINARY | OCT. 1, 2022 2:01 P.M. | REGULAR TONER |
| 0x0000_0002 | xxxx-xxxx | OCT. 2, 2022 3:00 P.M. | 3 | BINARY | OCT. 2, 2022 3:01 P.M. | COLOR FADABLE TONER |
| 0x0000_0005 | xxxx-xxxx | OCT. 3, 2022 2:20 P.M. | 3 | BINARY | OCT. 3, 2022 2:32 P.M. | COLOR FADABLE TONER |
| 0x0000_0006 | xxxx-zzzz | OCT. 3, 2022 4:16 P.M. | 5 | BINARY | OCT. 3, 2022 4:42 P.M. | REGULAR TONER |

FIG.12

EXAMPLE OF OUTPUT TONER TYPE DETERMINATION

| JOBID | COLOR FADABLE TONER SELECTION RATIO | RECEPTION-TIME PRINTING (THRESHOLD VALUE = 80%) | RESERVATION PRINTING (THRESHOLD VALUE = 40%) |
|---|---|---|---|
| 0x0000_0007 | 85% | COLOR FADABLE TONER | COLOR FADABLE TONER |
| 0x0000_0008 | 0% | REGULAR TONER | REGULAR TONER |
| 0x0000_0009 | 50% | REGULAR TONER | COLOR FADABLE TONER |

IMAGE FORMING APPARATUS AND METHOD FOR CONTROLLING THE SAME

BACKGROUND

Field of the Disclosure

The present disclosure relates to an image forming apparatus and a method for controlling the image forming apparatus.

Description of the Related Art

Awareness of sustainable development goals (SDGs) has been increased. Accordingly, there has been a demand for reusing printed paper on image forming apparatuses. Meanwhile, an image forming apparatus is known to support not only printing with regular toner but also printing with color fadable toner that enables the reuse of printed paper (see Japanese Patent Application Laid-Open No. 2018-072809).

In transmitting a print job from a personal computer (PC) to the image forming apparatus, the output toner type can be specified by using a printer driver. Even with a print job of reception-time printing (such as FAX) using no printer driver, the output toner type can also be preset by using a setting function of the image forming apparatus.

SUMMARY

According to an aspect of the present disclosure, an image forming apparatus including an execution unit configured to perform printing with a color fadable recording agent and printing with a color unfadable recording agent, includes a reception interface (IF) configured to receive a print job, and a controller having one or more processors which execute instructions stored in one or more memories, the controller being configured to set a recording agent to be used in executing the print job received by the reception IF, based on job attributes of the print job, including at least one of sending source information and an image data format.

Further features of the present disclosure will become apparent from the following description of exemplary embodiments with reference to the attached drawings.

BRIEF DESCRIPTION OF THE DRAWINGS

FIG. 3 is a flowchart illustrating processing performed when a print job is received.

FIGS. 4A and 4B illustrate examples of a job selection screen and a job printing screen, respectively.

FIG. 6, composed of FIGS. 6A and 6B, is a flowchart illustrating output toner type determination processing based on a print job history table.

FIGS. 7A and 7B illustrate examples of a job history screen and a job re-printing screen, respectively.

FIG. 9, composed of FIGS. 9A and 9B, is a flowchart illustrating output toner type determination processing based on a learning model.

FIGS. 10A and 10B illustrate examples of a print job table and a print job history table, respectively.

FIGS. 11A, 11B, and 11C illustrate examples of different target lists.

FIG. 12 illustrates an example of output toner type determination.

DESCRIPTION OF THE EMBODIMENTS

Exemplary embodiments of the present disclosure will be described below with reference to the accompanying drawings. The following exemplary embodiments are not intended to limit the present disclosure within the scope of the appended claims. Not all of the combinations of the features described in the exemplary embodiments are indispensable to the solutions for the present disclosure.

A first exemplary embodiment will be described below with reference to FIG. 1. In the first exemplary embodiment, a description will be provided of an image forming apparatus having a determination unit for determining an output toner type based on the job attributes of a print job by using a print job history table.

Figure 1:
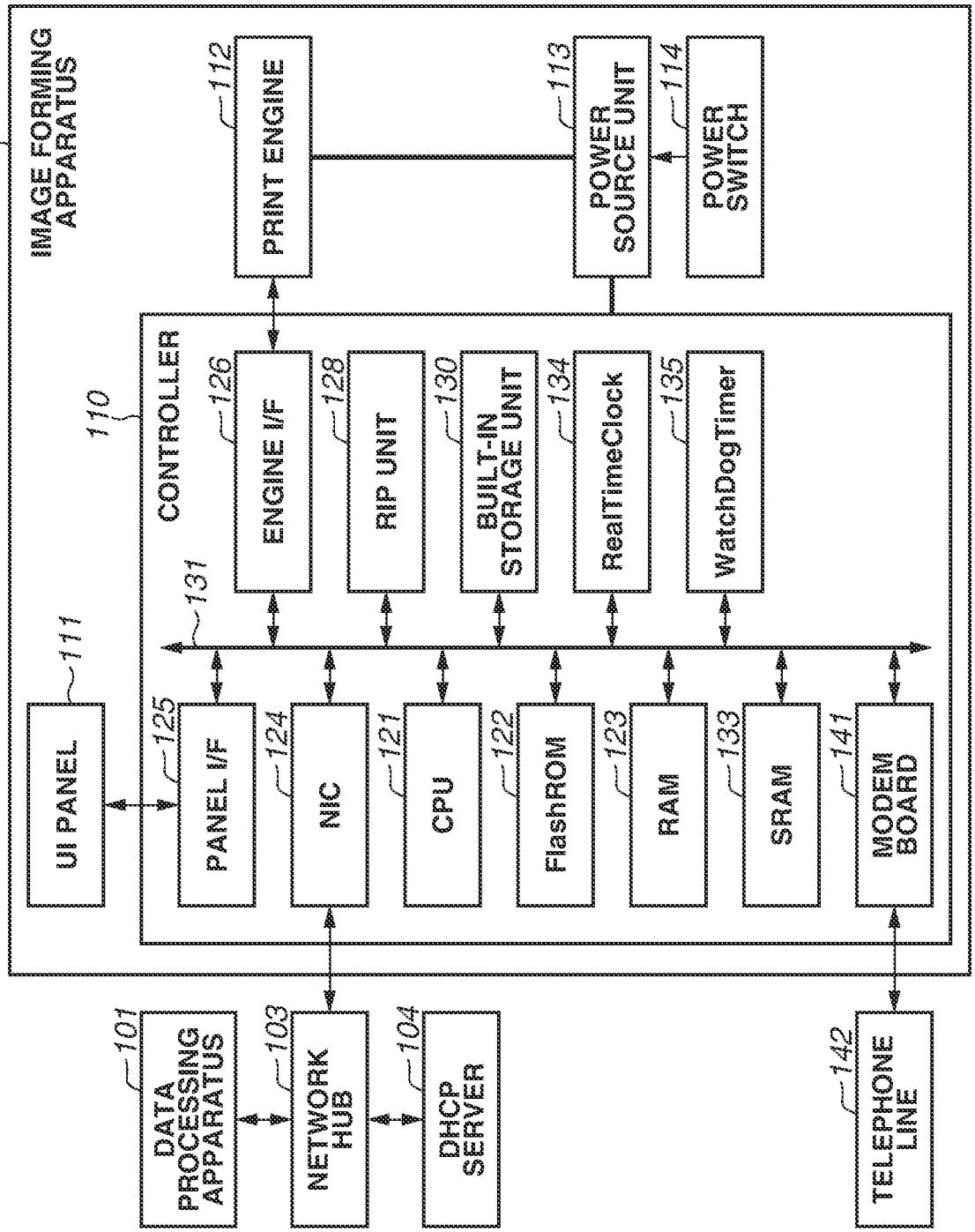
FIG. 1 is a block diagram illustrating a configuration of an image forming apparatus.

FIG. 1 is a block diagram schematically illustrating a configuration of an image forming apparatus 102 according to the present exemplary embodiment.

Referring to FIG. 1, the image forming apparatus 102 is connected to a data processing apparatus 101 and a Dynamic Host Configuration Protocol (DHCP) server 104 via a network hub 103.

The network hub 103 performs network communication between the data processing apparatus 101, the image forming apparatus 102, and the DHCP server 104. In the present exemplary embodiment, a description will be provided of a local network configuration in which the data processing apparatus 101, the image forming apparatus 102, and the DHCP server 104 are connected to the single network hub 103. However, the present disclosure is not limited to this configuration. For example, other network configurations using a plurality of network hubs are also applicable.

The data processing apparatus 101, which is, for example, a Personal Computer (PC), generates Print Description Language (PDL) data and transmits the PDL data to the image forming apparatus 102. In the processing for updating the firmware of the image forming apparatus 102, the data processing apparatus 101 transmits compressed data for updating the firmware of the image forming apparatus 102 to the image forming apparatus 102. The DHCP server 104 receives a network configuration information acquisition request based on the DHCP and transmits network configuration information as a response.

The image forming apparatus 102, which is, for example, a laser beam printer, receives the PDL data from the data processing apparatus 101 and forms an image on a sheet based on the received image data. The image forming apparatus 102 may be a multifunction peripheral having a plurality of functions including copy, scanner, and FAX functions. The image forming apparatus 102 includes a controller 110, a User Interface (UI) panel 111, a print engine 112, a power source unit 113, and a power switch 114.

The controller 110 is a controller board that generates bitmap data for printing based on the PDL data received from the data processing apparatus 101 and transmits the bitmap data to the print engine 112. The controller 110 itself is capable of generating PDL data and issuing a print instruction to print settings and statuses of the image forming apparatus 102 as a report.

The UI panel 111 includes a display unit (not illustrated) for presenting various information to the user and an operation unit (not illustrated) for receiving various operations from the user. For example, the UI panel 111 may include a touch panel in addition to physical buttons. The image forming apparatus 102 may have a function of turning ON or blinking the light emitting diodes (LEDs) of the UI panel 111 to inform the user of an error or warning that has occurred in the image forming apparatus 102. The image forming apparatus 102 may have a function of generating a warning sound from the buzzer of the UI panel 111 to inform the user of an error or warning that has occurred in the image forming apparatus 102.

The print engine 112 forms an image on a sheet with the electrophotographic method, based on the bitmap data received from the controller 110. In addition to the electrophotographic method using toner as a recording agent, for example, the image forming method may be the inkjet method using ink as a recording agent. (In this case, "output toner type", "regular toner", and "color fadable toner" in the present disclosure are replaced with "output ink type", "regular ink", and "color fadable ink", respectively.) The print engine 112 may have a plurality of color recording agents and be configured to perform color printing. The print engine 112 may further have a plurality of sheet feed stages and be configured to feed a sheet from the sheet feed stage specified in the PDL data out of the plurality of sheet feed stages.

According to the present exemplary embodiment, the print engine 112 has a function of changing an output toner type which is a type of toner to be used in forming an image on a sheet to either regular toner (unerasable toner) or color fadable toner (erasable toner) according to an instruction from the controller 110. The print engine 112 has a function of adjusting the image forming process, such as the paper conveyance speed and the fixing temperature, based on the output toner type. For example, the fixing temperature is changed between printing with the regular toner and printing with the color fadable toner.

The power source unit 113 supplies power to each component of the image forming apparatus 102. The power source unit 113 has a role of generating a voltage to be applied to operate each component and supplying the voltage thereto. The power switch 114 receives a power ON instruction and a power OFF instruction from the user. For example, when the user presses the power switch 114 on the image forming apparatus 102 in the power OFF state, the power source unit 113 is notified of the power switch depression event. The power source unit 113 starts supplying power to each component of the image forming apparatus 102.

The controller 110 includes a central processing unit (CPU) 121, a Flash read only memory (ROM) 122, memories (a random access memory (RAM) 123 and a static ram (SRAM) 133), a network interface controller (NIC) 124, and a panel interface (I/F) 125. The controller 110 further includes an engine I/F 126, a raster image processing (RIP) unit 128, a built-in storage unit 130 serving as a storage, and a real time clock 134. The controller 110 further includes a Watch Dog Timer 135. The controller 110 further includes a modem board 141 for communication via a telephone line 142. The controller 110 further includes a bus 131 for connecting these components.

The CPU 121 is a central processing unit that executes various programs to control the image forming apparatus 102. The Flash ROM 122 serves as a nonvolatile memory and stores an initial program which is executed upon reset release of the CPU 121. The RAM 123 serves as a volatile memory and stores temporary information when the CPU 121 executes various programs. The SRAM 133 serves as a volatile memory and stores data while the image forming apparatus 102 is supplied with power.

The NIC 124 is a network interface controller for interconnecting the image forming apparatus 102 and an apparatus outside the apparatus 102 via a network and relaying data communication (data transmission and reception) between the two apparatuses. According to the present exemplary embodiment, the image forming apparatus 102 may include a wireless communication unit in addition to a wired communication unit.

The panel I/F 125 is used for interconnecting the UI panel 111 and the controller 110 and relaying data communication, or data transmission and reception, between the UI panel 111 and the controller 110.

The engine I/F 126 is used for interconnecting the print engine 112 and the controller 110 and relaying data communication or data transmission and reception, between the print engine 112 and the controller 110.

The RIP unit 128 converts intermediate data into bitmap data and loads the bitmap data into the RAM 123. In the present exemplary embodiment, a description has been provided of a configuration in which the dedicated RIP unit 128 independent of the CPU 121 converts intermediate data into bitmap data. However, the image forming apparatus 102 does not necessarily need to include the RIP unit 128. In a configuration in which the image forming apparatus 102 does not include the RIP unit 128, the CPU 121 performs processing for converting the PDL data received from the data processing apparatus 101 into bitmap data.

The built-in storage unit 130 is a nonvolatile storage device for storing an operating system (OS) which is activated from the initial program. The built-in storage unit 130 is, for example, an embedded Multi Media Card (eMMC), a hard disk, or a solid state drive. The built-in storage unit 130 can secure a mass-storage area at a relatively low cost. Thus, OS programs and data to be used by the OS are stored in the built-in storage unit 130.

The Real Time Clock 134 is a hardware chip for managing time information in the image forming apparatus 102 in a nonvolatile way. The Real Time Clock 134 is driven with power supplied from a battery that is a power source independent of the power source unit 113. Thus, the time information is periodically updatable even after power of the image forming apparatus 102 is turned OFF.

The modem board 141 transmits and receives a FAX job which corresponds to a reception-time printing, to and from a FAX apparatus of the image forming apparatus 102 via the telephone line 142.

Figure 2A:
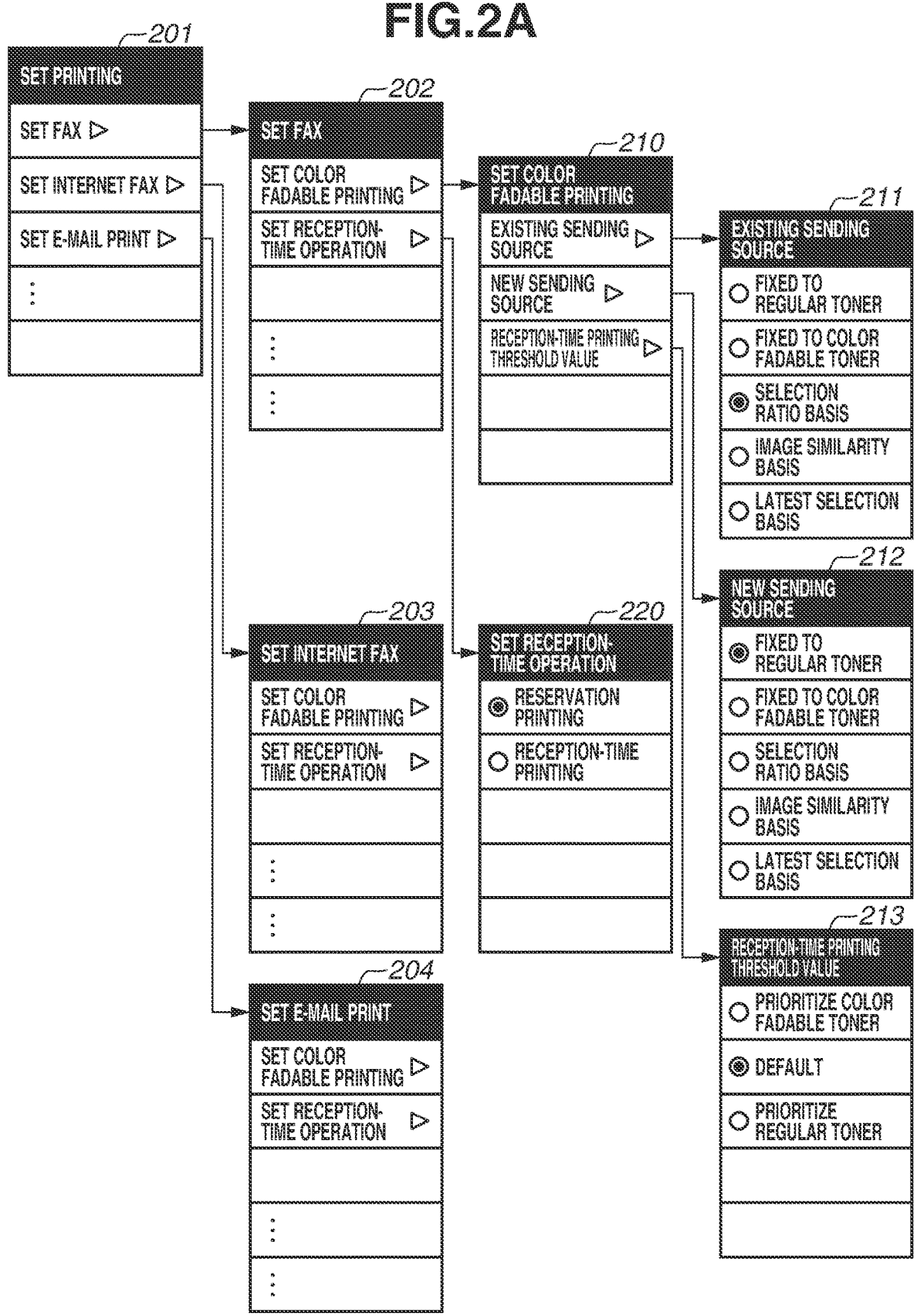
FIGS. 2A, 2B, and 2C illustrate examples of a hierarchical structure of a print job setting menu.
Figure 2B:
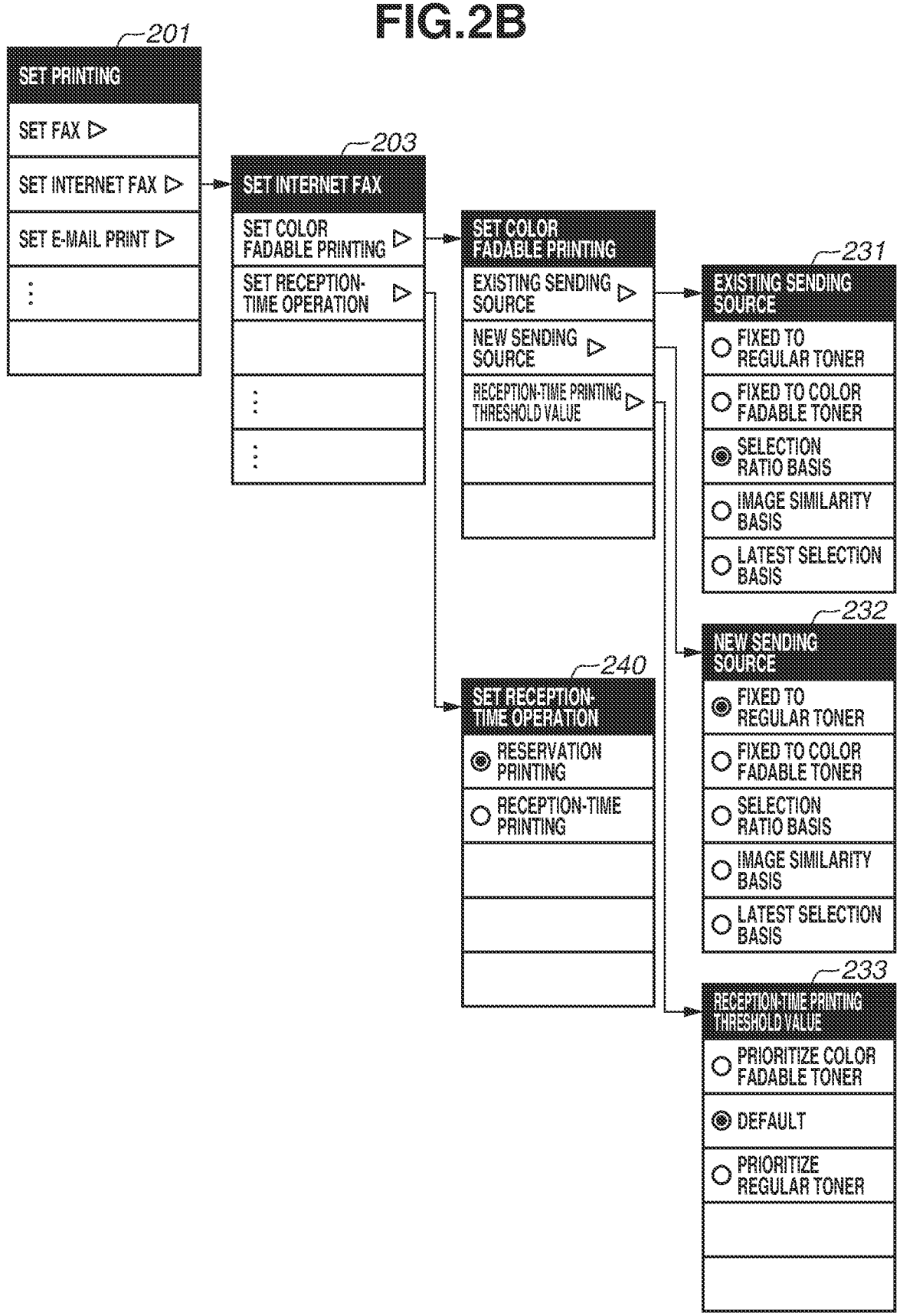
Figure 2C:
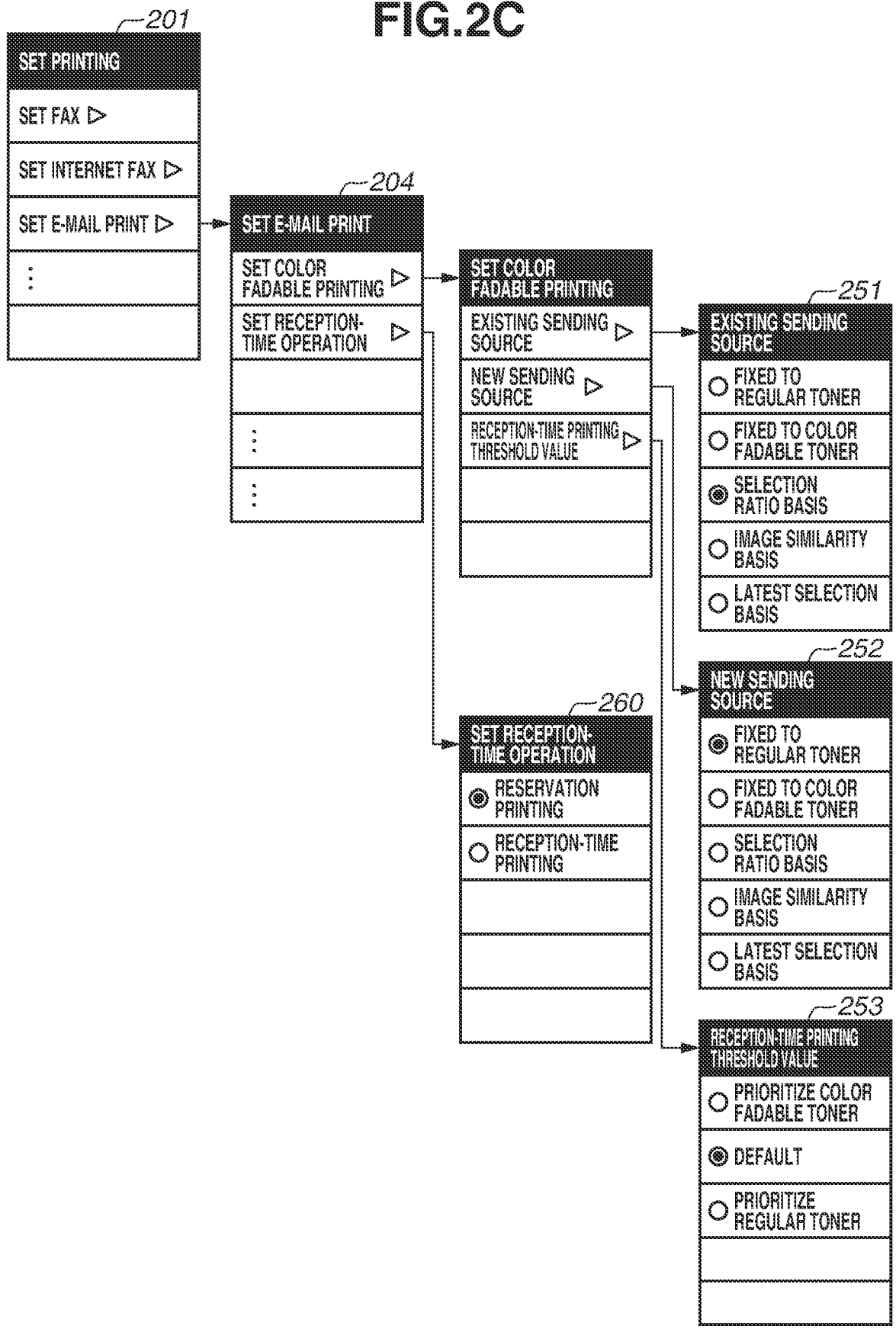

FIGS. 2A, 2B, and 2C illustrate examples of hierarchical structures of a print job setting ("Set Printing") menu. The image forming apparatus 102 has a function of displaying a menu for enabling the user to make settings for each function via the UI panel 111.

FIG. 2A illustrates an example of a hierarchical structure of a print job setting menu ("Set Printing" menu) for a FAX job. A "Set Printing" menu 201 includes a "Set FAX" item, an "Set Internet FAX" item, and a "Set Email Printing" item. When the "Set FAX" item is selected, a "Set FAX" menu 202 appears. When the "Set Internet FAX" item is selected, an "Set Internet FAX" menu 203 appears. When the "Set Email Printing (Email print job)" item is selected, a "Set Email Printing" menu 204 appears.

The "Set FAX" menu 202 includes a "Set Color Fadable Printing" item and a "Set Reception-Time Operation" item.

When the "Set Color Fadable Printing" item is selected, the print job setting menu displays a "Set Color Fadable Printing" menu 210. The "Set Color Fadable Printing" menu 210 includes an "Existing Sending Source" item, a "New Sending Source" item, and a "Reception-Time Printing Threshold Value" item. When the "Existing Sending Source" item is selected, the print job setting menu displays an "Existing Sending Source" menu 211, which is a color fadable printing setting menu for an existing sending source. When the "New Sending Source" item is selected, the print job setting menu displays a "New Sending Source" menu 212, which is a color fadable printing setting menu for a new sending source. The "Existing Sending Source" menu 211 and the "New Sending Source" menu 212 are menu screens for selecting the toner type determination method to be used to print a print job.

The "Set Printing" menu enables the user to select the output toner type, specifically, "Fixed To Regular Toner" or "Fixed To Color Fadable Toner", depending on the job type and constantly select the same toner type determination method. Further, according to the present exemplary embodiment, the print job setting menu enables the user to select a method for automatically determining the output toner type for each print job based on the selection ratio ("Selection Ratio Basis"), image similarity ("Image Similarity Basis"), or latest selection ("Latest Selection Basis"). The automatic output toner type determination method will be described below with reference to FIG. 6, composed of FIGS. 6A and 6B.

When the "Reception-Time Printing Threshold Value" item is selected, the print job setting menu displays a "Reception-Time Printing Threshold Value" menu 213. The "Reception-Time Printing Threshold Value" menu 213 is used to set a threshold value for determining whether to perform printing with color fadable toner in a case where "Reception-Time Printing" is set in a "Set Reception-Time Operation" menu 220. The "Reception-Time Printing Threshold Value" menu 213 includes a "Prioritize Color Fadable Toner" item, a "Default" item, and a "Prioritize Regular Toner" item. The "Prioritize Color Fadable Toner" item is a setting for more proactively using the color fadable toner. The "Prioritize Regular Toner" item is a setting for more proactively using the regular toner. The "Default" item is the default setting for the image forming apparatus 102.

When the "Set Reception-Time Operation" item is selected, the print job setting menu displays the "Set Reception-Time Operation" menu 220. The "Set Reception-Time Operation" menu 220 includes a "Reservation Printing" item (second execution setting) and an "Immediate Printing" item (first execution setting). The "Set Reception-Time Operation" menu 220 is used to select whether to immediately start printing in response to receiving a print job or perform reservation printing. The "Reservation Printing" item is a setting for storing (reserving) a received print job in the image forming apparatus 102 without execution of printing. In response to receiving an instruction to print a reservation printing job, the image forming apparatus 102 executes the print job. In contrast, with the "Immediate Printing" item, the image forming apparatus 102 immediately starts printing in response to receiving a print job.

FIG. 2B illustrates an example of a modification structure of the print job setting menu for an Internet FAX job. FIG. 2C illustrates an example of a modification structure of the print job setting menu for an Email print job. Descriptions of these menus are similar to the descriptions of the "Set FAX" menu 202, and redundant descriptions thereof will be omitted.

FIG. 3 is a flowchart illustrating processing to be performed at reception of a print job. To simplify descriptions, error cases will be omitted. An example error case is a case where a print job cannot be normally completed because of an insufficient amount of consumables, such as toner and printing sheets.

In step S301, the CPU 121 receives a print job from a source external to the image forming apparatus 102. For example, the CPU 121 receives a FAX job transmitted from a FAX apparatus which is connected by the telephone line 142, via the modem board 141. Alternatively, the CPU 121 receives an Internet FAX job, Email print job, and the like transmitted from the data processing apparatus 101 via the NIC 124. Print jobs that are based on protocols other than FAX jobs, Internet FAX jobs, and Email print jobs are also applicable.

In step S302, the CPU 121 adds the print job to a print job list and spools the print job on the built-in storage unit 130. In this case, the CPU 121 analyzes the received job and acquires the number of pages and the image format of the print job.

Here, a print job table manages received print jobs stored in the built-in storage unit 130, which are to be printed by the image forming apparatus 102. FIG. 10A illustrates an example of a print job table.

The print job table stores information about print jobs, including JOBID, sending source information, reception date and time, the number of pages, and image format. According to the present exemplary embodiment, these pieces of information about a print job and image data of the print job are collectively referred to as "job attributes". JOBID is a unique number for identifying the print job. JOBID may be assigned job type information. If the upper 8 bits of JOBID are 0x0, the print job is a FAX job. If the upper 8 bits of JOBID are 0x1, the print job is an Internet FAX job.

The sending source information is identifier information for identifying the sending source of the print job. For example, when the print job is a FAX job or Internet FAX job, the sending source information is a telephone number. For simplification, the sending source is represented by a telephone number in the present exemplary embodiment. For example, a configuration in which a new database for managing the sending source information is provided and in which the same sending source is comprehensively manageable even for print jobs from different protocols may be applicable. A representative number may be provided so that a plurality of telephone numbers is assigned to the same sending source. The concept of the sending source information is not limited to these examples.

The reception date and time indicate the date and time when the image forming apparatus 102 receives a print job. The number of pages indicates the number of pages to be printed in printing the print job. To simplify descriptions, the present exemplary embodiment uses the number of A4 pages. The image format means the data format when the print job is transmitted. For example, a FAX job is transmitted in the binary format represented only with monochrome or in the color format.

For example, a print job with JOBID 0x000_0007 is transmitted from the telephone number xxxx-xxxx at 7:18 P.M. on Oct. 3, 2022. The print job includes binary format image data for two pages. This also applies to print jobs with other JOBIDs.

In step S303, the CPU 121 determines whether the reception-time operation setting based on the job type of the print job is "Immediate Printing". For a FAX job, for example, the reception-time operation setting is set in the "Set Reception-Time Operation" menu 220. For an Internet FAX job, the reception-time operation setting is set in a "Set Reception-Time Operation" menu 240. For an Email print job, the reception-time operation setting is set in the "Set Reception-Time Operation" menu 260. In step S311, if the reception-time operation setting is "Immediate Printing", the CPU 121 determines the output toner type based on the job attributes of the print job and the print job history table (described below). The output toner type determination processing will be described in detail below with reference to the flowchart in FIG. 6, composed of FIGS. 6A and 6B.

In step S321, the CPU 121 executes the print job by using the toner of the output toner type. In step S322, the CPU 121 associates the job attributes of the print job with the output toner type and adds the print job to the print job history table.

The print job history table which is stored in the built-in storage unit 130 stores history information when a print job is printed. FIG. 10B illustrates an example of the print job history table.

The print job history table is an extended version of the print job table, which additionally includes the printing date and time and the output toner type. The printing date and time are information about the date and time when the print job is printed. The output toner type is the output toner type set when the print job is printed.

In step S323, in response to printing of the print job being completed, the CPU 121 deletes the print job from the print job table.

In step S304, the CPU 121 detects an event of depression of the power switch 114 to check whether a system shutdown request has been issued. If no system shutdown request has been issued (NO in step S304), the processing returns to step S301. In step S301, the CPU 121 waits for reception of the next print job. If a system shutdown request has been issued (YES in step S304), the CPU 121 ends the processing.

FIGS. 4A and 4B illustrate examples of a job selection screen and a job printing screen.

Descriptions will be very complicated if event processing for all of UI components including the scroll bar displayed in each screen is described. Thus, in the present exemplary embodiment, descriptions will be provided of parts essential to understand the present disclosure.

FIG. 4A illustrates an example of the job selection screen. The job selection screen is used to select a print job from the print job table. In the job selection screen, information about each of the print jobs included in the print job table is displayed in a print job table view 410. Print jobs to be displayed in the print job table view 410 may be narrowed down according to a condition. For example, only FAX jobs are displayed depending on a job type selected by a job type selection pull-down menu 411.

The user selects a print job to be processed from the print job table view 410. The user selects the processing to be performed on the print job by using a button. For example, when the user presses an Execute Printing button 401, a job printing screen (described below) appears. When the user presses a Delete Job button 402, the print job is deleted from the list of the print job table, and the display of the print job table view 410 is updated. When the user presses a Cancel button 403, the job selection screen closes.

FIG. 4B illustrates an example of the job printing screen. The job printing screen is used to issue a print instruction for a print job selected in the job selection screen.

The job printing screen includes a print job preview 461. The print job preview 461 is a display area for displaying the image data included in the print job.

The job printing screen also includes an "Output Toner Type" menu 471 for checking and setting an output toner type to be used for printing of the print job. The default value of the "Output Toner Type" menu 471 is a result made by using an output toner determination means (described below). The user can check the image of the print job in the print job preview 461 and change the "Output Toner Type" menu 471 as appropriate.

The job printing screen further includes an Execute Printing button 451, a Delete Job button 452, and a Cancel button 453.

When the user presses the Execute Printing button 451, the CPU 121 executes the print job by using the output toner selected in the "Output Toner Type" menu 471. When the user presses the Delete Job button 452, the CPU 121 deletes the selected print job from the print job table and changes the display to the job selection screen. When the user presses the Cancel button 453, the CPU 121 changes the display to the job selection screen.

Figure 5:
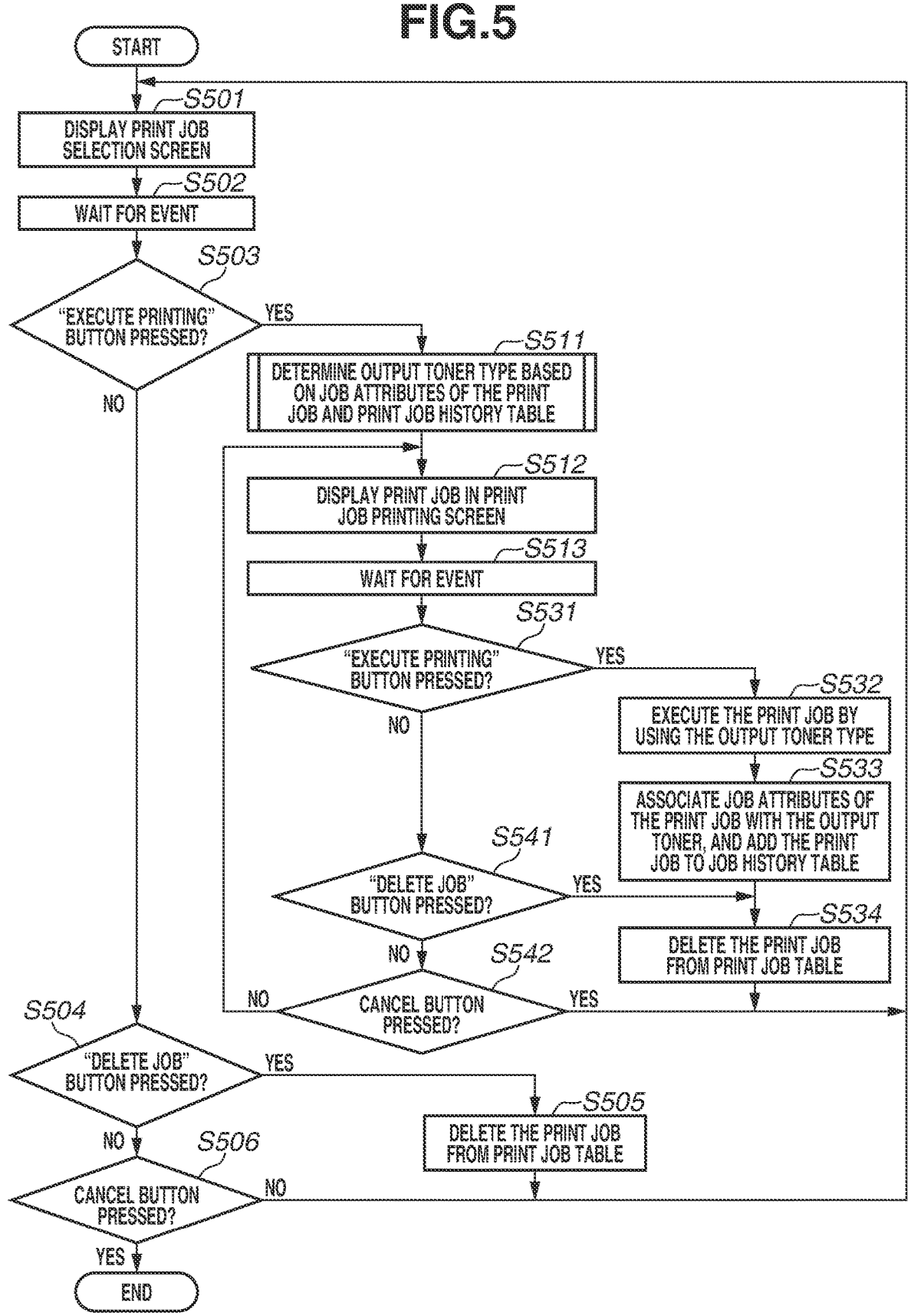
FIG. 5 is a flowchart illustrating processing for the job selection screen and the job printing screen.

FIG. 5 is a flowchart illustrating processing for the job selection screen and the job printing screen.

In step S501, the CPU 121 displays the job selection screen based on details in the print job table.

In step S502, the CPU 121 waits for an operation event from the user. In step S503, the CPU 121 determines whether the Execute Printing button 401 is pressed.

If the Execute Printing button 401 is pressed in the job selection screen (YES in step S503), the processing proceeds to step S511. In step S511, the CPU 121 determines the output toner type from the job attributes of the print job and the print job history table. The output toner type determination processing will be described in detail below with reference to the flowchart in FIG. 6, composed of FIGS. 6A and 6B.

In step S512, the CPU 121 displays the information about the print job in the job printing screen. In this case, the image data of the print job is displayed in the print job preview 461. The previously determined toner type is set to the "Output Toner Type" menu 471.

In step S513, the CPU 121 waits for an operation event from the user. If the CPU 121 detects the depression of the Execute Printing button 451 (YES in step S531), the processing proceeds to step S532. In step S532, the CPU 121 executes the print job by using the output toner type set in the "Output Toner Type" menu 471.

In step S533, the CPU 121 associates the job attributes of the print job with the output toner type and adds the print job to the print job history table. When printing of the print job is completed, then in step S534, the CPU 121 deletes the print job from the print job table. In step S501, the CPU 121 displays job selection screen again.

If the CPU 121 detects the depression of the Delete Job button 452 (YES in step S541), the processing proceeds to step S534. In step S534, the CPU 121 deletes the print job from the print job table. In step S501, the CPU 121 displays the job selection screen again. If the CPU 121 detects the depression of the Cancel button 453 (YES in step S542), the processing returns to step S501. In step S501, the CPU 121 displays the job selection screen. If the CPU 121 detects other events (NO in step S542), the processing returns to step S512. In step S512, the CPU 121 continues the display of the job printing screen. If the Delete Job button 402 is pressed (YES in step S504), the processing proceeds to step S505. In step S505, the CPU 121 deletes the print job from the print job table. In step S501, the CPU 121 displays the job selection screen again.

If the Cancel button 403 is pressed (YES in step S506), the CPU 121 ends the display of the job selection screen. If the CPU 121 detects other events (NO in step S506), the processing returns to step S501. In step S501, the CPU 121 continues the display of the job selection screen.

FIG. 6, composed of FIGS. 6A and 6B, is a flowchart illustrating the output toner type determination processing based on the print job history table.

In step S601, the CPU 121 determines whether the sending source of the print job has been registered in the print job history table.

In step S602, if no print job corresponding to the print job history table is present (NO in step S601), the processing proceeds to step S602. In step S602, the CPU 121 selects the output toner type determination method selected in the "New Sending Source" menu 212, 232, or 252, that is, the color fadable printing setting menu for a new sending source, according to the job type of the print job.

If a print job corresponding to the print job history table is present (YES in step S601), the processing proceeds to step S603. In step S603, the CPU 121 selects the output toner type determination method selected in the "Existing Sending Source" menu 211, 231, or 251, that is, the color fadable printing setting menu for an existing sending source, according to the job type of the print job.

In step S610, the CPU 121 switches processing depending on the output toner type determination method. If the output toner type determination method is "fixed to the regular toner" ("Fixed To Regular Toner" in step S610), the processing proceeds to step S611. In step S611, the CPU 121 selects the regular toner as the output toner type and then ends the output toner type determination processing. If the output toner type determination method is "fixed to the color fadable toner" ("Fixed To Color Fadable Toner" in step S610), the processing proceeds to step S612. In step S612, the CPU 121 selects the color fadable toner as the output toner type and then ends the output toner type determination processing.

If the output toner type determination method is neither "fixed to the regular toner" nor "fixed to the color fadable toner" ("Miscellaneous" in step S610), the processing proceeds to step S620. In step S620, the CPU 121 extracts a target list including jobs with the same sending source and the same image format as those of the print job from the print job history table.

In step S621, the CPU 121 determines whether the target list extracted in step S620 includes 0 jobs. If the target list includes 0 jobs (YES in step S621), the processing proceeds to step S622. In step S622, the CPU 121 extracts a target list including jobs with the same image format as the print job from the print job history table.

In step S623, the CPU 121 determines whether the target list extracted in step S622 includes 0 jobs. If the target list includes 0 jobs (YES in step S623), the processing proceeds to step S624. In step S624, the CPU 121 extracts a target list including all of print jobs in the print job history table.

In step S625, the CPU 121 determines whether the target list extracted in step S624 includes 0 jobs. If the target list includes 0 jobs (YES in step S625), the processing proceeds to step S611. In step S611, the CPU 121 selects the regular toner as the output toner type and then ends the output toner type determination processing.

In these operations in the target list extraction processing, the CPU 121 does not extract print jobs provided with the cancellation attribute (described below). This processing will be described in detail below with reference to FIG. 8.

In step S631, the CPU 121 switches processing based on the output toner type determination method. If the output toner type determination method is based on the selection ratio ("Selection Ratio Basis" in step S631), the processing proceeds to step S641. In step S641, the CPU 121 calculates the color fadable toner selection ratio from the target list. According to the present exemplary embodiment, the CPU 121 calculates the color fadable toner selection ratio by using the number of pages for weighting. More specifically, the color fadable toner selection ratio is Y/(X+Y) where X denotes the number of pages printed with the regular toner and Y denotes the number of pages printed with the color fadable toner. The method for calculating the color fadable toner selection ratio is modifiable in diverse ways, for example, the sheet area to be printed in a print job is considered for weighting, and the present disclosure is not limited to the above-described example.

Example 1

FIG. 11A illustrates the target list for JOBID=0x0000_0007. In step S620, the CPU 121 extracts a target list including print jobs having the sending source information xxxx-xxxx and the binary image format.

Since the number of pages printed with the regular toner is 1 and the number of pages printed with the color fadable toner is 6, the color fadable toner selection ratio for JOBID=0x0000_0007 is calculated as 6/(1+6)=85%.

Example 2

FIG. 11B illustrates the target list for JOBID=0x0000_0008. In step S620, the CPU 121 extracts a target list including print jobs having the sending source information xxxx-yyyy and the color image format.

Since the number of pages printed with the regular toner is 14 and the number of pages printed with the color fadable toner is 0, the color fadable toner selection ratio for JOBID=0x0000_0008 is calculated as 0/(14+0)=0%.

Example 3

FIG. 11C illustrates the target list for JOBID=0x0000_0009. Since no print jobs having the sending source information xxxx-vvvv is present in the print job history table, the target list extracted in step S620 includes 0 jobs. In step S622, the CPU 121 extracts a target list including print jobs having the binary image format.

For JOBID=0x0000_0009, the list of print job history includes no jobs having the same sending source information. Thus, the output toner type determination method is to be determined in accordance with a result of the "New Sending Source" menu 212, specifically, the color fadable printing setting menu for a new sending source. The method for calculating the color fadable toner selection ratio will be described below on the premise that the "Selection Ratio Basis" item is selected in the "New Sending Source" menu 212, specifically, the color fadable printing setting menu for a new sending source.

Since the number of pages printed with the regular toner is 6 and the number of pages printed with the color fadable toner is 6, the color fadable toner selection ratio for JOBID=0x0000_0009 is calculated as 6/(6+6)=50%.

In step S642, the CPU 121 switches processing based on the purpose of the output toner type determination processing. More specifically, in a case where the processing is called from step S311, the CPU 121 performs the output toner type determination processing for the purpose of reception-time printing. In step S643, the CPU 121 sets a threshold value to a reception-time printing threshold value. In a case where the processing is called from step S511, the CPU 121 performs the output toner type determination processing for the purpose of reservation printing.

In step S644, the CPU 121 sets a threshold value to a reservation printing threshold value. According to the present exemplary embodiment, in performing reception-time printing, the CPU 121 performs printing without checking the image data of the print job, so that printing with the regular toner is prioritized. In contrast, in performing reservation printing, the CPU 121 performs printing after checking the image data of the print job, so that printing with the color fadable toner is prioritized. In further performing reservation printing, the CPU 121 assumes print instruction issuance after the user sets the output toner type again as appropriate.

In step S651, the CPU 121 determines whether the color fadable toner selection ratio is smaller than a threshold value. If the color fadable toner selection ratio is smaller than the threshold value (YES in step S651), the processing proceeds to step S652. In step S652, the CPU 121 sets the regular toner to the output toner type.

If the color fadable toner selection ratio is equal to or larger than the threshold value (NO in step S651), the processing proceeds to step S653. In step S653, the CPU 121 sets the color fadable toner to the output toner type.

FIG. 12 illustrates examples of output toner type determination for different print jobs. As an example, the threshold value for reception-time printing is set to 80%, and the threshold value for reservation printing is set to 40%.

For a print job with JOBID=0x0000_0007, the color fadable toner selection ratio is 85%. This value exceeds the above-described threshold values for reception-time printing and reservation printing, and therefore the output toner type is determined to be the color fadable toner.

For the print job JOBID=0x0000_0008, the color fadable toner selection ratio is 0%. Therefore, the output toner type is determined to be the regular toner.

For the print job JOBID=0x0000_0009, the color fadable toner selection ratio is 50%. For reception-time printing, since the threshold value does not exceed 80%, the regular toner is selected as the output toner type. For reservation printing, since the threshold value exceeds 40%, the output toner type is determined to be the color fadable toner.

The present exemplary embodiment assumes that the "Default" item is selected in the "Reception-Time Printing Threshold Value" menu 213, 233, or 253. Accordingly, the reception-time printing threshold value is set to 80%. In contrast to this, if the "Prioritize Color Fadable Toner" item is selected, the reception-time printing threshold value may be set to 70%. In other embodiments, if the "Prioritize Regular Toner" item is selected, the reception-time printing threshold value may be set to 90%. If the threshold value is changed, settings may be changed so that the color fadable toner or the regular toner is more proactively used according to user's applications. The present exemplary embodiment changes the reception-time printing threshold value according to the job type of each print job. Further, the reception-time printing threshold value may be more finely set based on whether the sending source is an existing sending source or a new sending source or based on other criteria, such as the purpose of performing the output toner type determination processing.

In the present exemplary embodiment, a description has been provided of a very simple output toner type determination method based on whether the color fadable toner selection ratio is equal to or larger than the reception-time printing threshold value, the present disclosure is not limited thereto. For example, the CPU 121 can also obtain a result close to the result of the output toner type determination processing performed by the user, by using various algorithms ranging from the K-means method to a support vector machine and deep learning.

If the output toner type determination method is based on the latest history ("Latest History Basis" in step S631), the processing proceeds to step S661. In step S661, the CPU 121 searches for recently output print jobs from the target list. In step S662, the CPU 121 determines the relevant output toner type as the output toner type.

If the output toner type determination method is based on the image similarity ("Image Similarity Basis" in step S631), the processing proceeds to step S671. In step S671, the CPU 121 searches for the print job having image data with the highest similarity with the image data of the print data from the target list. In step S672, the CPU 121 determines the relevant output toner type to be the output toner type.

The output toner type determination based on the latest history and the image similarity can be expanded to various algorithms. For example, for "Latest History Basis", the CPU 121 may determine the output toner type based on a logic that determines the output toner type by majority among a predetermined number of recently output print jobs. For "Image Similarity Basis", the image similarity calculation method may be based not only on simple pattern matching but also on various feature quantities. Examples of various feature quantities include the image data format, image data content, image hash value, and image feature quantity. The present disclosure is not limited to these examples.

FIGS. 7A and 7B illustrate examples of a job history screen and a job re-printing screen.

FIG. 7A is an example of the job history screen. The job history screen is used to select a print job to be re-printed from the print job history table. The job history screen displays information about each print job included in the print job history table in a print job history table view 710.

The user selects a processing target print job from the print job history table view 710. The user selects the processing to be performed on the print job by using buttons. For example, when the user presses an Execute Re-printing button 721, the print job re-printing screen (described below) appears. When the user presses a Cancel button 722, the job history screen closes.

FIG. 7B illustrates an example of the print job re-printing screen. The print job re-printing screen is used to receive a re-print instruction for the print job selected in the job history screen.

The print job re-printing screen includes an "Output Toner Type" menu 751 for checking and setting the output toner type to be used for re-printing the print job. The default value of the "Output Toner Type" menu 751 is the output toner type stored as a job attribute of the print job. The user can change the output toner type to be used for re-printing the print job, by using the "Output Toner Type" menu 751.

The print job re-printing screen further includes an Execute Re-printing button 761 and a Cancel button 762. When the user presses the Execute Re-printing button 761, the CPU 121 re-executes the print job by using the output toner selected in the "Output Toner Type" menu 751. When the user presses the Cancel button 762, the CPU 121 changes the display to the job selection screen.

Figure 8:
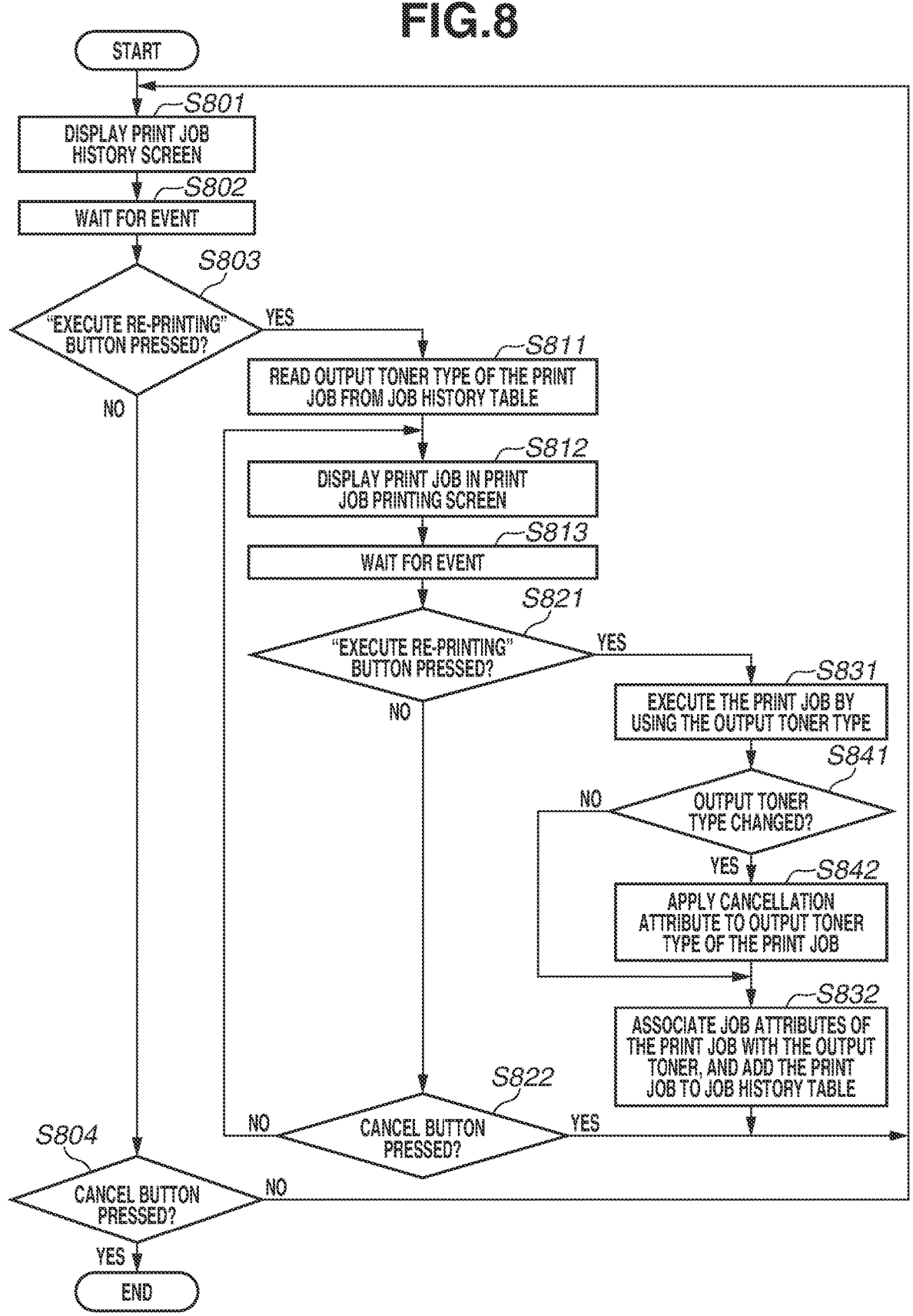
FIG. 8 is a flowchart illustrating processing for the job history screen and the job re-printing screen.

FIG. 8 is a flowchart illustrating processing for the job history screen and the job re-printing screen.

In step S801, the CPU 121 displays the job history screen based on the details of the print job history table. In step S802, the CPU 121 waits for an operation event from the user. In step S803, the CPU 121 determines whether the Execute Printing button 401 is pressed.

If an Execute Re-printing button 720 is pressed in the job history screen (YES in step S803), the processing proceeds to step S811. In step S811, the CPU 121 reads the output toner type of the print job from the print job history table.

In step S812, the CPU 121 displays information about the print job in the print job re-printing screen. The read toner type is set in the "Output Toner Type" menu 751. In step S813, the CPU 121 waits for an operation event from the user.

If the CPU 121 detects the depression of the Execute Re-printing button 761 (YES in step S821), the processing proceeds to step S831. In step S831, the CPU 121 re-executes the print job by using the output toner type set in the "Output Toner Type" menu 751. In step S841, the CPU 121 determines whether the output toner type has been changed for the print job. If the CPU 121 determines that the output toner type has been changed (YES in step S841), the processing proceeds to step S842. In step S842, the CPU 121 applies the cancellation attribute to the output toner type of the re-printing target print job.

In step S832, the CPU 121 associates the job attributes of the print job with the output toner type, and adds the print job to the print job history table. In step S801, the CPU 121 re-displays the job history screen.

If the CPU 121 detects the depression of the Cancel button 762 (YES in step S822), the processing returns to step S801. In step S801, the CPU 121 displays the job history screen. If the CPU 121 detects other events (NO in step S822), the processing proceeds to step S812. In step S812, the CPU 121 continues the display of the job printing screen.

If the Cancel button 722 is pressed (YES in step S804), the processing ends the display of the print job history screen. If the CPU 121 detects other events (NO in step S804), the processing returns to step S801. In step S801, the CPU 121 continues the display of the print job history screen.

The cancellation attribute of the output toner type will be supplementarily described below. The cancellation attribute is applied when a print job having been printed with toner of either one output toner type is re-printed with toner of the other output toner type. For example, if a print job having been printed with the regular toner is re-printed with the color fadable toner or if a print job having been printed with the color fadable toner is re-printed with the regular toner, the print job is applied with the cancellation attribute. If a print job is applied with the cancellation attribute to be set to a re-printing target print job, the print job is excluded from the target list in the subsequent output toner type determination processing for another print job.

If a print job is printed with toner of the output toner type different from the originally desired one and then recovered with re-printing, the determination can also be stored in the job history table. If a print job is re-printed with toner of the same output toner type, the CPU 121 determines that the output toner type is determined to be selected next time.

The image forming apparatus 102 has a function of automatically determining a suitable output toner type based on the past print job history for print jobs with reception-time printing. This enables the user to select a suitable output toner type without bothering to suitably set the output toner type, for example, without checking the print data.

A second exemplary embodiment will be described below with reference to FIG. 9, composed of FIGS. 9A and 9B. In the second exemplary embodiment, a description will be provided of an image forming apparatus having a determination means for determining the output toner type based on the job attributes of a print job by using a color fadable toner selection ratio calculation model.

FIG. 9, composed of FIGS. 9A and 9B, is a flowchart illustrating the output toner type determination processing based on a learning model.

Processing for determining the output toner type determination method is similar to that in steps S601 to 603 in FIG. 6, composed of FIGS. 6A and 6B, and redundant descriptions thereof will be omitted.

In step S910, the processing branches based on the output toner type determination method.

If "Fixed To Color Fadable Toner" or "Fixed To Regular Toner" is selected, the CPU 121 selects the output toner type corresponding to the respective item. The processing has been described above in conjunction with FIG. 6, composed of FIGS. 6A and 6B, specifically, steps S611 to S612, and redundant descriptions thereof will be omitted.

If "Latest History Basis" or "Image Similarity Basis" is selected in step S910, the processing proceeds to step S911. In step S911, the CPU 121 extracts (generates) a target list based on the job attributes of the print job. The relevant processing has been described above in conjunction with FIG. 6, composed of FIGS. 6A and 6B, specifically, steps S620 to S625, and redundant descriptions thereof will be omitted. After a target list is extracted, then in step S912, the processing branches based on the output toner type determination method. The subsequent processing has already been described above in conjunction with FIG. 6, composed of FIGS. 6A and 6B, specifically, steps S661 to S662 and S671 to 672, and redundant descriptions thereof will be omitted.

If "Selection Ratio Basis" is selected in step S910, the processing proceeds to step S951. In step S951, the CPU 121 reads the color fadable toner selection ratio calculation model from the built-in storage unit 130 to the RAM 123. In step S952, the CPU 121 calculates the color fadable toner selection ratio for the job attributes of the print job by using the color fadable toner selection ratio calculation model. The subsequent processing has been described above in conjunction with FIG. 6, composed of FIGS. 6A and 6B, specifically, steps S642 to S653, and redundant descriptions thereof will be omitted.

The color fadable toner selection ratio calculation model will be supplementarily described below. The color fadable toner selection ratio calculation model refers to model data for machine learning with the job attributes of a print job serving as inputs and the likelihood (selection ratio) that the color fadable toner is to be selected for the print job serving as outputs. In implementing the color fadable toner selection ratio calculation model, various machine learning algorithms are applicable. Examples of machine learning algorithms include: (1) a machine learning model for an estimation algorithm based on an artificial neural network technique including deep learning, (2) a machine learning model for an estimation algorithm based on a Support Vector Machine (SVM) technique, and (3) a machine learning model for an estimation algorithm based on a K Neighborhood Method technique.

The input attribute of the color fadable toner selection ratio calculation model may be determined in consideration of the presence or absence of objects extracted from the image data. For example, the input attribute may be determined in consideration of the presence or absence of a one- or two-dimensional bar code, the presence or absence of a sealing or signature, or the presence or absence of a specific keyword or other objects in the image data.

The input attribute of the color fadable toner selection ratio calculation model may be determined in consideration of the image data type.

For example, the image data type may be determined in consideration of whether the image data is a Computer-Aided Design (CAD) image. More specifically, image data having a considerable number of thin lines can be determined to be a CAD image.

The image data type may be determined in consideration of whether the image data has a fixed form (e.g., purchase order). More specifically, the image data type can be determined by using the image similarity to a known fixed form as an index.

The output attribute of the color fadable toner selection ratio calculation model is a ratio (likelihood) that the color fadable toner is to be used for a print job. For example, if the color fadable toner selection ratio is 100%, the print job is determined to be a print job which is to be printed with the color fadable toner. If the color fadable toner selection ratio is 0%, the print job is determined to be a print job which is to be printed with the regular toner.

A descriptions has been provided of the color fadable toner selection ratio calculation model in a form in which a trained model is prestored in the built-in storage unit 130 at the time of shipment of the image forming apparatus 102. Further, after execution of a print job is completed or at the timing when the image forming apparatus 102 enters a power-saving mode, the color fadable toner selection ratio calculation model may be trained and updated by the CPU 121. The learning may be performed with an on-line learning method in which learning is made each time a print job is completed or a batch learning method in which learning is made after completion of a predetermined number of print jobs. Alternatively, a trained model may be transmitted from the data processing apparatus 101 at regular or irregular intervals, and the image forming apparatus 102 may update the color fadable toner selection ratio calculation model based on the received trained model.

The image forming apparatus according to the first exemplary embodiment determines the output toner type based on the print job history table, specifically, utilization track records. In contrast to this, the image forming apparatus according to the second exemplary embodiment is configured to determine the output toner type based on the job attributes of a print job. More specifically, even if the utilization track records are not accumulated, for example, the apparatus can determine a likely output toner type by using a color fadable toner selection ratio calculation model that has been trained. The output toner determination methods according to the first and the second exemplary embodiments may be considered according to the utilization track records.

As described above, different types of algorithms are applicable to the output toner type determination means according to the present disclosure as long as the output toner type of toner to be used by a print job can be determined based on the job attributes of the print job. These algorithms may be changed with the spirit and scope of the present disclosure not being departed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-185372, filed Nov. 21, 2022, which is hereby incorporated by reference herein in its entirety.

What is claimed is:

1. An image forming apparatus including an execution unit configured to perform printing with a color fadable recording agent and printing with a color unfadable recording agent, the image forming apparatus comprising:
   a reception interface (IF) configured to receive a print job; and
   a controller having one or more processors which execute instructions stored in one or more memories, the controller being configured to:
   determine a recording agent to be used based a job attribute and print history of the print job received by the reception IF, including at least one of sending source information and an image data format; and
   set a recording agent based on the determined recording agent for the received print job.

2. The image forming apparatus according to claim 1, wherein the received print job is a FAX job.

3. The image forming apparatus according to claim 1, wherein the received print job is an Internet FAX job.

4. The image forming apparatus according to claim 1, wherein the received print job is an Email print job.

5. The image forming apparatus according to claim 1, further comprising a storage device configured to, in execution of a print job, associate the job attributes of the executed print job with an output toner type and store the print job as a print job history, wherein, based on the job attributes of the received print job and the print job history, the controller sets the recording agent to be used in executing the received print job.

6. The image forming apparatus according to claim 5, wherein the controller performs:
generating a target list including print jobs from the print job history based on the job attributes of the received print job; and
setting the recording agent to be used in executing the received print job, based on the target list.

7. The image forming apparatus according to claim 6, wherein the controller performs:
searching for a representative print job of the print jobs included in the target list, based on printing date and time; and
setting the recording agent to be used in executing the received print job, based on a recording agent used in executing the representative print job.

8. The image forming apparatus according to claim 6, wherein the controller performs:
searching for a representative print job of the print jobs included in the target list, based on image data; and
setting the recording agent to be used in executing the received print job, based on a recording agent used in executing the representative print job.

9. The image forming apparatus according to claim 6, wherein the controller performs:
searching for a representative print job of the print jobs included in the target list, based on at least one of an image feature quantity, an image similarity, and an image hash value; and
setting the recording agent to be used in executing the received print job, based on a recording agent used in executing the representative print job.

10. The image forming apparatus according to claim 6, wherein the controller performs:
calculating a likelihood that a color fadable recording agent is to be used in a print job included in the target list; and
setting the recording agent to be used in executing the received print job, based on the calculated likelihood.

11. The image forming apparatus according to claim 6, wherein the controller performs:
selecting a print job from the print job history;
receiving a re-printing instruction for the selected print job;
checking whether the setting of a recording agent to be used for the selected print job is changed; and
excluding the checked print job from the target list.

12. The image forming apparatus according to claim 5, wherein, the controller generates, from the print job history, a first target list including print jobs with a same sending source and a same image format as those of the received print job, a second target list including print jobs with the same image format as those of the received print job, and a third target list including all of print jobs included in the print job history.

13. The image forming apparatus according to claim 5, wherein the controller performs:
setting a first execution setting for executing the received print job without receiving a print instruction, or a second execution setting for executing the received print job in response to receiving a print instruction; and
changing a threshold value for determining the recording agent to be used in executing the received print job according to whether the first execution setting or the second execution setting is set.

14. The image forming apparatus according to claim 5, wherein the controller differentiates between a first setting method for a recording agent to be used in a case where the print job history includes a sending source of the received print job and a second setting method for a recording agent to be used in a case where the print job history does not include the sending source of the received print job.

15. The image forming apparatus according to claim 1, wherein the controller performs:
reading the job attributes of the print job, and a machine learning model for estimating an index for determining a setting of a recording agent to be used in executing a print job; and
setting the recording agent to be used in executing the received print job, based on the job attributes of the print job, by executing the read machine learning model.

16. The image forming apparatus according to claim 15, wherein the machine learning model includes at least one of:
(1) a machine learning model for an estimation algorithm based on an artificial neural network technique including deep learning;
(2) a machine learning model for an estimation algorithm based on a Support Vector Machine (SVM) technique; and
(3) a machine learning model for an estimation algorithm based on a K Neighborhood Method technique.

17. A method for controlling an image forming apparatus including an execution unit configured to perform printing with a color fadable recording agent and printing with a color unfadable recording agent, the method comprising:
receiving a print job;
determining a recording agent to be used based a job attribute and print history of the print job received by the reception IF, including at least one of sending source information and an image data format; and and
setting a recording agent based on the determined recording agent for the received print job.

* * * * *